(12) United States Patent
Gazier et al.

(10) Patent No.: US 8,776,161 B2
(45) Date of Patent: Jul. 8, 2014

(54) SYSTEMS AND METHODS FOR VIDEO PROCESSING IN NETWORK EDGE DEVICES

(75) Inventors: Michael Gazier, Ottawa (CA); Ian Duncan, Ottawa (CA); Daniel Rivaud, Kanata (CA)

(73) Assignee: Ciena Corporation, Hanover, MD (US)

(*) Notice: Subject to any disclaimer, the term of this patent is extended or adjusted under 35 U.S.C. 154(b) by 1140 days.

(21) Appl. No.: 12/029,877

(22) Filed: Feb. 12, 2008

(65) Prior Publication Data

US 2009/0201988 A1    Aug. 13, 2009

(51) Int. Cl.
*H04N 7/173* (2011.01)
*H04N 21/2343* (2011.01)
*H04N 21/24* (2011.01)
*H04N 7/12* (2006.01)
*H04N 21/258* (2011.01)
*H04N 21/222* (2011.01)

(52) U.S. Cl.
CPC . *H04N 21/234309* (2013.01); *H04N 21/23439* (2013.01); *H04N 21/2402* (2013.01); *H04N 21/25808* (2013.01); *H04N 21/222* (2013.01)
USPC ......... 725/118; 725/98; 725/119; 375/240.07

(58) Field of Classification Search
USPC .......................................... 725/118
See application file for complete search history.

(56) References Cited

U.S. PATENT DOCUMENTS

| | | | |
|---|---|---|---|
| 7,058,027 B1 * | 6/2006 | Alessi et al. | 370/310.1 |
| 7,106,757 B2 * | 9/2006 | Hong et al. | 370/469 |
| 7,266,099 B2 * | 9/2007 | Roy et al. | 370/331 |
| 7,292,602 B1 * | 11/2007 | Liu et al. | 370/468 |
| 7,599,297 B2 * | 10/2009 | Claes et al. | 370/236 |
| 2005/0190794 A1 * | 9/2005 | Krause et al. | 370/485 |
| 2006/0130113 A1 * | 6/2006 | Carlucci et al. | 725/118 |
| 2007/0101377 A1 * | 5/2007 | Six et al. | 725/86 |
| 2007/0192812 A1 * | 8/2007 | Pickens et al. | 725/94 |
| 2007/0201500 A1 * | 8/2007 | Deshpande | 370/412 |
| 2009/0083279 A1 * | 3/2009 | Hasek | 707/10 |
| 2009/0150943 A1 * | 6/2009 | Vasudevan et al. | 725/86 |
| 2009/0158362 A1 * | 6/2009 | Kajos | 725/91 |

* cited by examiner

*Primary Examiner* — Chris Parry
(74) *Attorney, Agent, or Firm* — Clements Bernard PLLC; Christopher L. Bernard; Lawrence A. Baratta, Jr.

(57) ABSTRACT

The present invention provides systems and methods for video processing, such as transcoding, storage, quality testing, and the like, in network edge devices. The present invention embeds various video processing capabilities within a network to provide advantages, such as superior per-user video handling, reduced network bandwidth, increased service offerings, and the like.

23 Claims, 9 Drawing Sheets

SYSTEMS AND METHODS FOR VIDEO PROCESSING IN NETWORK EDGE DEVICES

FIELD OF THE INVENTION

The present invention relates generally to data and communication networks. More particularly, the present invention provides systems and methods for video processing, such as transcoding, storage, quality testing, and the like, in network edge devices.

BACKGROUND OF THE INVENTION

Currently, video is a key bandwidth driver for network growth. Accordingly, long haul and particularly metro access/aggregation networks are experiencing significant new demands driven by video services. For example, video services can include high-definition television (HDTV) services, broadcast services, video sharing, streaming video, and the like. Forecasts have pointed to video becoming the predominate service over Internet Protocol (IP) and Ethernet-based networks.

Referring to FIG. 1, a typical segmentation of a network 10 providing video content to end users is a core network 12 connected to an access/aggregation network 14. The core network 12 can include an edge router/switch 16 and multiple network routers/switches 18 with each router/switch 16,18 interconnected. The access/aggregation network 14 can include routers/switches 20 and an access device 22. Typically, the core network 12 includes layer two and three functionality, and the access/aggregation network 14 includes layer two functionality.

Conventionally, a video source 24 can be centralized, such as connected to the core network 12. For example, the video source 24 can include a video home office (VHO) with a satellite feed, a production studio, third party network, or the like. An end user 26 typically connects to the access device 22 on the access/aggregation network 14. Typically the video source 24 includes a transcoder. Video typically requires transcoder devices. Transcoding is the ability to take existing video content and change the format, bitrate and/or resolution in order to view it on another video playback device. The original data is decoded or decompressed to a raw intermediate format in a way that mimics the standard playback of the original codec and then recodes this into the target format.

Transcoders are usually part of the production studio, the satellite upfeed or downfeed office, or the centralized video network office of the provider. Transcoders are not part of edge devices, such as the edge router/switch 16, the routers/switches 18, 20, and the access device 22, due to cost considerations in part. Accordingly, the various devices 16, 18, 20, 22 do not include video specific features, such as transcoding, storage, and video quality testing. Note, the trend is to move video distribution towards the edge, such as through Video servers and the like.

The conventional network 10 relies on centralized video features, i.e. the centralized video source 24. However, this does not leverage the fact modern processes have allowed cost effective increases in distributed processing and storage. These allow stronger customization of user requirements, and thus reduce costs for example network costs by reducing the number of video streams sent around or last-mile costs to the end user 26. For example, conventionally multiple streams are sent for each video channel to the end user 26 from the video source 24 (note, there may be intermediate elements, such as servers and the like). These multiple streams could include a 100 kbps stream, a 700 kbps stream, a 1.5 Mbps stream, a 5 Mbps stream, a 18 Mbps (HDTV) stream, etc.

It would be advantageous to incorporate transcoding, storage, and quality testing into 16, 20, 22 of the core network 12 and the access/aggregation network 14 to leverage distributed processing for reduce cost, lower network bandwidth requirements, and increased features.

BRIEF SUMMARY OF THE INVENTION

In various exemplary embodiments of the present invention, the present invention provides systems and methods for video processing, such as transcoding, storage, quality testing, and the like, in network edge devices. The present invention embeds various video processing capabilities within a network to provide advantages, such as superior per-user video handling, reduced network bandwidth, increased service offerings, and the like.

In an exemplary embodiment of the present invention, a network edge device with video processing capabilities includes a network interface configured to connect to one or more switch/routers; and a transcoder configured to receive one or more video streams from the network interface, wherein the one or more video streams are in an encoding format and wherein the transcoder is configured to process each of the one or more video streams based on the encoding format for a client connected to the network edge device. Optionally, the transcoder is further configured to adapt bandwidth of each of the one or more video streams for the client responsive to bandwidth between the network edge device and the client. Alternatively, the transcoder is further configured to process multiple channels of the one or more video streams to provide a multiplexed variable bit rate on each of the multiple channels to the client; and wherein a sum of the multiple channels in the multiplexed variable bit rate is shaped. The transcoder can be further configured to adapt processing based on activity of the client. Optionally, the transcoder is further configured to process the one or more video streams such that transitions in processing of one and more parameters of the encoding format are progressively coded to be imperceptible to the client. Alternatively, the transcoder is further configured maintain a version of each of the one or more video streams with a start of encoder reference frame so that the start of encoder reference frame can be sent to the client upon joining; and wherein the transcoder is able to perform a burst after a channel change to refill a buffer.

The client can connect to the network edge device through a physical medium including one of a digital subscriber loop, a coaxial cable connection, a wireless connection, Ethernet switch, Internet Protocol router, and a passive optical network connection. Optionally, the transcoder performs processing including embedding error correction based on the physical medium; and wherein the transcoder monitors a physical layer forward error correction to meet a target bit error rate when encoding. The transcoder can include traffic management capabilities with an ability to prioritize requests for retransmitted frames. The transcoder processing includes one or more of transcoding, transsizing, transrating, translating/converting, summarizing, reformatting, splicing, generating, testing, and adding to each of the one or more video streams. Optionally, the network edge device further includes memory connected to the transcoder, wherein the memory is configured to store portions of the one or more video streams, and wherein the memory is utilized to provide trick play. Alternatively, the transcoder is configured to retransmit video to the client from the memory as required; and wherein the memory is utilized for video on demand functionality.

The client can be configured to request a channel from the one or more video streams, and wherein the transcoder is configured to interpret the request from the client and perform transcoding on the channel accordingly. To process each of the one or more video streams based on the encoding format includes transcoding to different encoding levels; and wherein the transcoder includes different encoders for a single line with multiple clients. The request can include one of a Session Initiation Protocol, Hypertext Transfer Protocol, Extensible Markup Language Request, a Digital storage media command and control request (DSM-CC), a custom message over Internet Protocol, and an OpenCable Application Platform request; wherein the request includes one or more of bandwidth abilities, set size, decoder feature modes, encryption, and error correction capabilities; wherein the network edge device is configured to translate the request to the network interface; and wherein the transcoder includes encryption key support for encryption and decryption on any of the one or more video streams and the request. Optionally, the transcoder is configured to receive different signaling formats from the client. Alternatively, the transcoder is configured to perform two or more passes for encoding. The transcoder can include a graphic processing unit. One of a connection from the transcoder to the client, a connection from the transcoder to the one or more switch/routers, a connection from the one or more switch/routers to a core network, a connection from one of the one or more switch/routers to another one of the more or more switch/routers, and a combination thereof is configured to be tested and monitored with respect to video performance; and wherein the client includes one of one end and both ends of the connection at one or more of a forward error correction level, an MPEG level, a real media level, and a packet loss level. Optionally, the client includes a set top box, and wherein a plurality of clients including set top boxes are configured as a distributed resource for processing the one or more video streams In another exemplary embodiment of the present invention, a method of providing video to a client through a network edge device includes transmitting one or more video streams each with an encoding format to the network edge device; receiving a channel request from the client for one video stream of the one or more video streams; transcoding the one video stream based on available bandwidth to the client, wherein the transcoding is performed at the network edge device; and providing the transcoded video stream to the client.

In yet another exemplary embodiment of the present invention, a network with embedded video processing includes one or more network edge devices; a video source connected to the one or more network edge devices, wherein the video source is configured to provide one or more video streams to the one or more network edge devices; wherein the one or more network edge devices are configured to transcode the one or more video streams responsive to clients attached to the one or more network edge devices. The network with embedded video processing can further include one or more intermediate network elements connected to the one or more network edge devices; wherein the one or more intermediate network elements are configured to transcode the one or more video streams responsive to clients attached to the one or more network edge devices. The one or more network edge devices and the one or more intermediate network elements are configured to participate in a peer-to-peer network and in community computing.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments of the present invention, the present invention provides systems and methods for video processing, such as transcoding, storage, quality testing, and the like, in network edge devices. The present invention embeds various video processing capabilities within a network to provide advantages, such as superior per-user video handling, reduced network bandwidth, increased service offerings, and the like.

Figure 1:
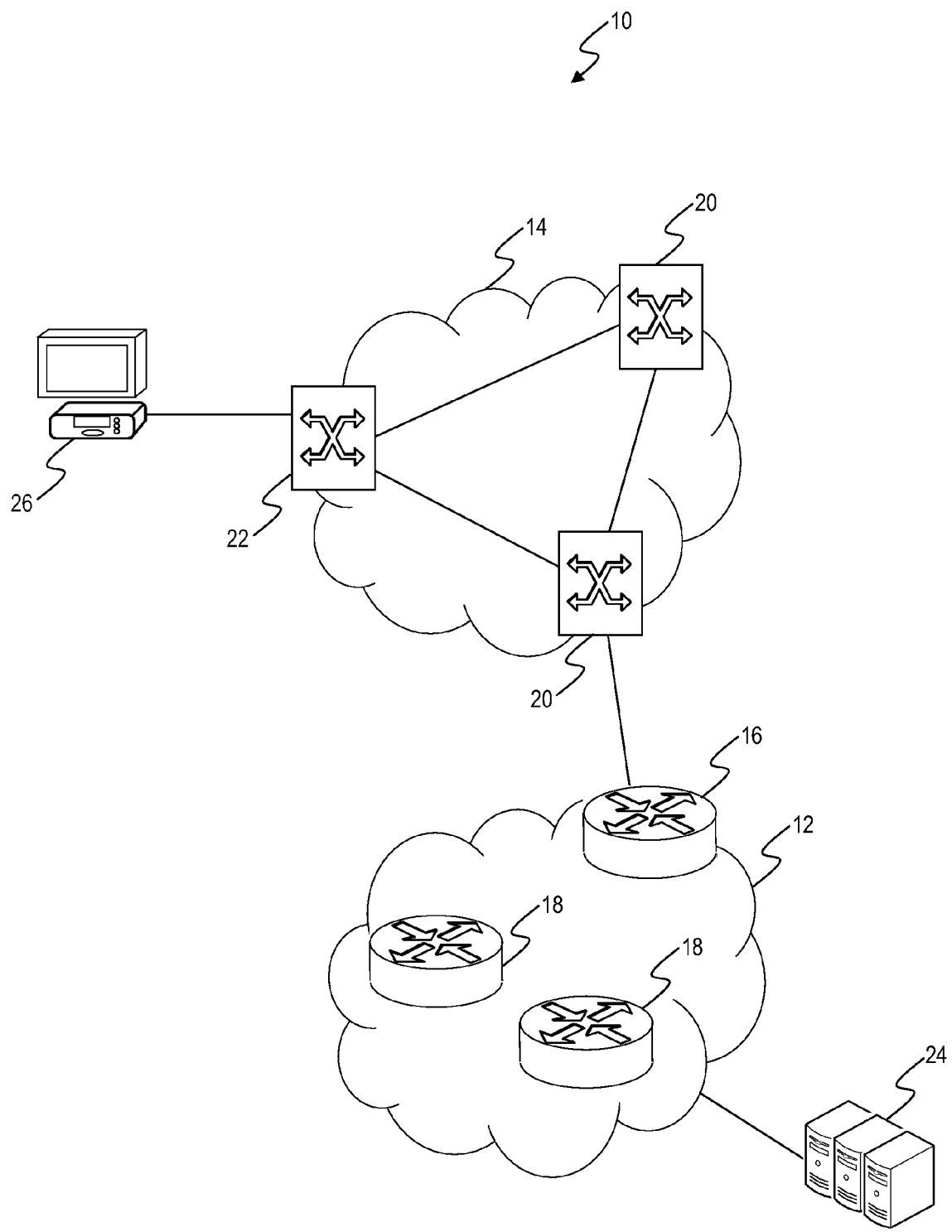
FIG. 1 is a diagram of a network providing video content to end users through a core network connected to an access/aggregation network.
Figure 2:
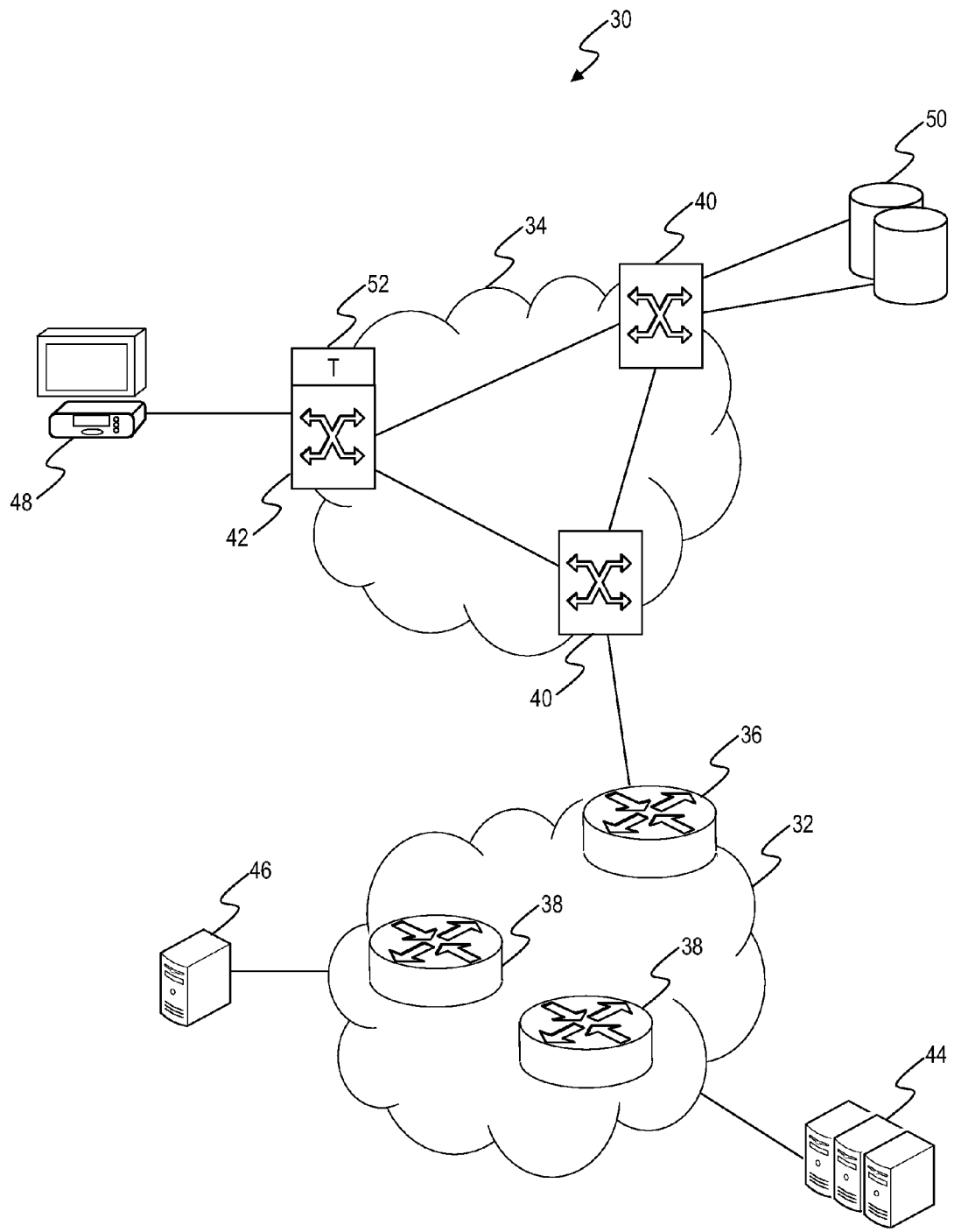
FIG. 2 is diagram of a network providing video content end users through a core network connected to an access/aggregation network with video processing capabilities embedded within network edge devices according to an exemplary embodiment of the present invention.

Referring to FIG. 2, a network 30 providing video content to end users includes a core network 32 connected to an access/aggregation network 34 according to an exemplary embodiment of the present invention. The core network 32 can include an edge router/switch 36 and multiple network routers/switches 38 with each router/switch 36, 38 interconnected. The access/aggregation network 34 can include routers/switches 40 and an access device 42. Typically, the core network 32 includes layer two and three functionality, and the access/aggregation network 34 includes layer two functionality.

As described herein, a video source 44 can connect to the core network 32. The video source 44 can include a video home office (VHO) with a satellite feed, a production studio, third party network, or the like. Essentially, the video source 44 provides origination of video content. The network 30 can also include a Video on Demand (VoD) controlling element 46 with middleware. The VoD controlling element 46 can include a server connected to the core network 32 and configured to control video streams from the video source 44 to multiple end users, such as an end user 48.

The access/aggregation network 34 is configured to provide broadband access to the end user. The access device 42 can include a cable modem termination system (CMTS), a digital subscriber loop access multiplexer (DSLAM), an Ethernet switch, a gigabit passive optical network (GPON) switch, a radio base station, a broadband remote access switch (BRAS), an edge router, and the like. Those of ordinary skill in the art will recognize that the access device 42 can include any network element capable of providing broadband access to the end user 48. Additionally, the access/aggregation network 34 can include local VoD servers 50 configured to locally cache video content on the access/aggregation network 34.

In an exemplary embodiment of the present invention, the access device 42 is configured with a transcoder device 52. Accordingly, the network 30 can broadcast (or multicast) a set of channels in a single high resolution encoding to the access device 42, i.e. from the video source 44 or the VoD servers 50. At the access edge 42, each individual user 48 has different and changing requirements. For example, a DSLAM has multiple DSL lines each with different performance characteristics (provisioned bandwidth, error performance, etc.). Each line may also have a different number and type of user clients (e.g., an HDTV with a picture-in-picture (PIP), plus a standard TV). Note, this could be detected by or provisioned via a device at the end user 48, such as a set top box (STB) for example. STBs as distributed resources can be used to accomplish the various functions described herein.

The transcoder device 52 is configured to provide transcoding of the set of channels based on requirements at the end user 48. Advantageously, only a single set of channels in a single high resolution encoding is required over the access/aggregation network 34. The transcoder device 52 recodes individual channels of the set of channels to optimize the bandwidth of each channel, e.g, 15 Mbps for HDTV, 300 kbps for PIP, and 1.5 Mbps for broadcast TV. Additionally, the access device 42 and the transcoder device 52 can know what capabilities are required for each user 48. For example, one particular user 48 can require MPEG-2, another user 48 could require DIVX, and a third could require H.264. The transcoder device 52 can adapt the set of channels to each of those formats.

Figure 3:
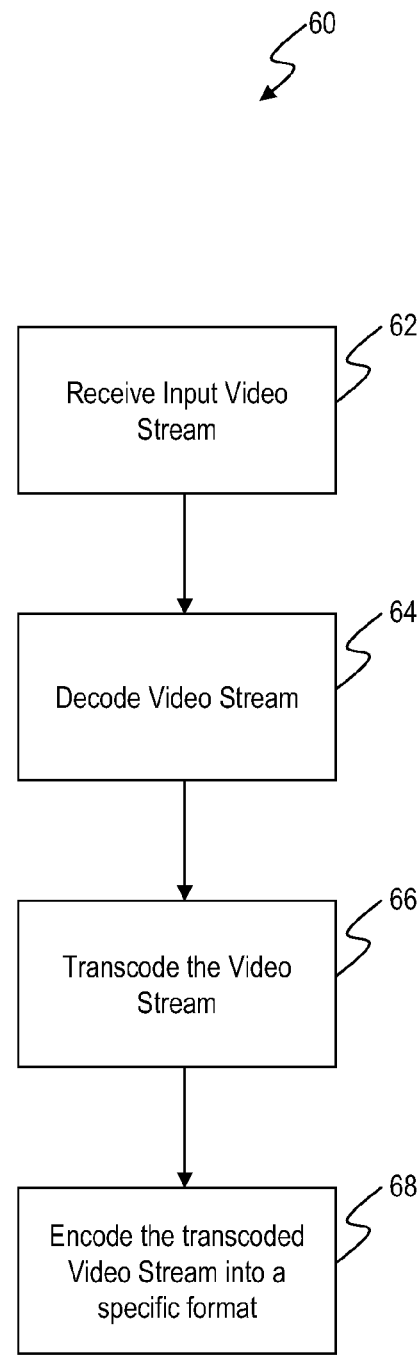
FIG. 3 is a flowchart illustrating an operation of a transcoder device according to an exemplary embodiment of the present invention.

Referring to FIG. 3, a flowchart illustrates an operation 60 of the transcoder device 52 according to an exemplary embodiment of the present invention. The transcoder device 52 is configured to receive an input video stream (step 62). Note, the transcoder device 52 can be configured to handle multiple streams as required based on the number of connected end users. The input video stream can include a single high resolution encoding. The transcoder device 52 is configured to decode the video stream (step 64). Here, the transcoder device 52 is decoding a specific video stream, such as based on a user request or the like. The transcoder device 52 transcodes the video stream (step 66). The process of transcoding can involve selectively dropping data from the single high resolution encoding. Generally, transcoding is decoding an incoming data stream from its original format and re-encoding the data stream to a new format (there are forms of optimization possible including not decoding and (smart) simple frame drops). For example, formats can include HDTV, MPEG, PIP, DIVX, etc. Finally, the transcoder device 52 encodes the transcoded video stream into the specific format (step 68). Accordingly, the access device can now provide the video stream to the end user in the specific format.

Figure 4:
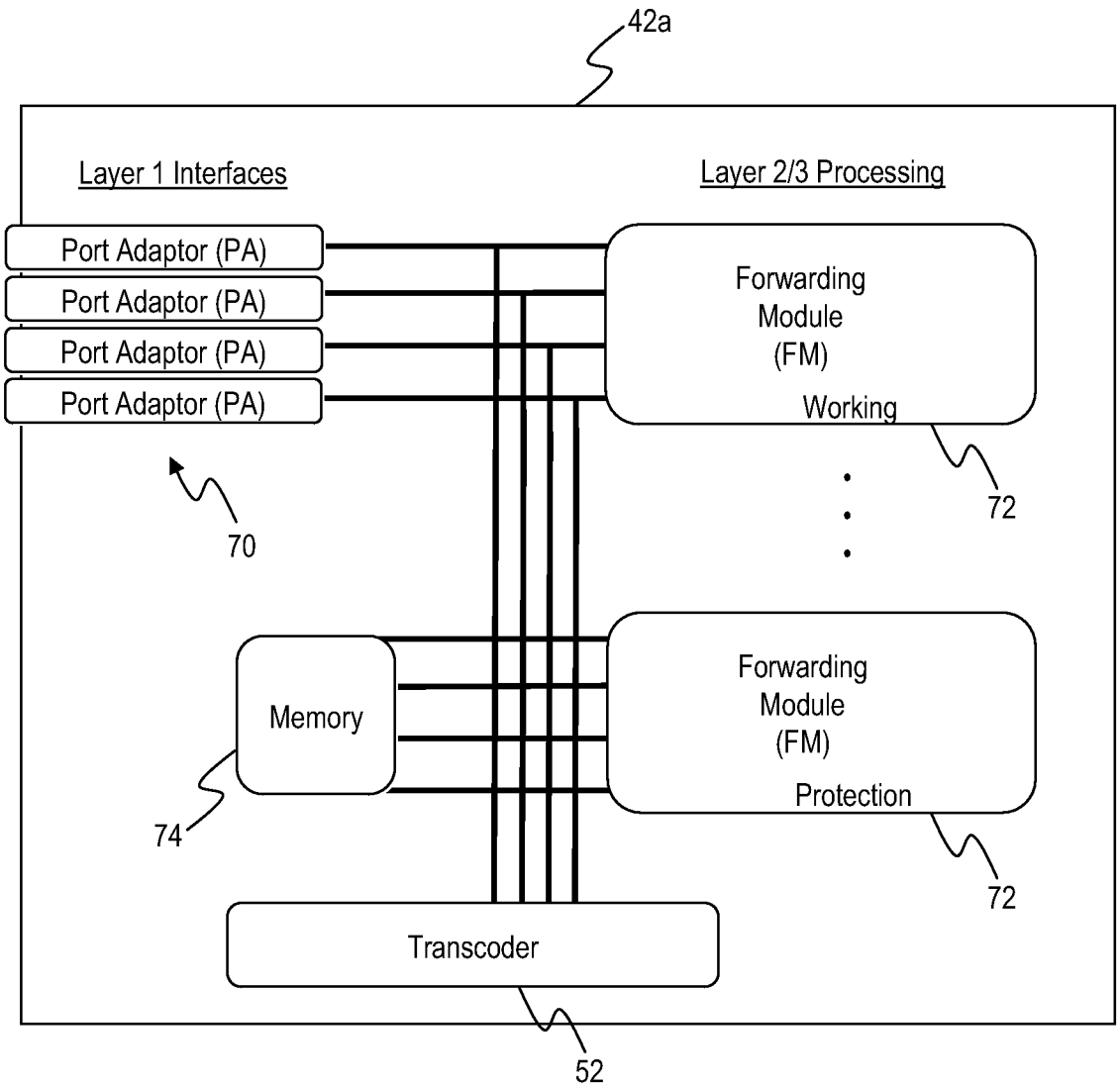
FIG. 4 is a block diagram of an access device with a transcoder device according to an exemplary embodiment of the present invention.

Referring to FIG. 4, a block diagram of an access device 42a with a transcoder device 52 is illustrated according to an exemplary embodiment of the present invention. Generally, the access device 42a is a switch/router network element configured to transfer packets from one port adaptor 70 to another port adaptor 70. The access device 42a generally includes multiple port adaptors 70 interconnected, such as through a backplane, mid-plane, or the like, to working and protect forwarding modules 72. Those of ordinary skill in the art will recognize that the transcoder device 52 can be integrated within any type of access device, and the port adaptor 70 and forwarding module 72 mechanism is shown for illustration purposes.

The port adaptors 70 provide physical layer zero/one connectivity to the network and to end users. For example, each port adaptor 70 can include multiple, independent ports. Ports can include Ethernet (10/100/1000 GbE), Optical (OC-3/STM-3, OC-12/STM-4, OC-48/STM-16), ATM, DS3/E3, Frame Relay, TDM over Packet, Data Over Cable Service Interface Specification (DOCSIS), xPON (Passive Optical Network), and the like. The physical media of the ports can include optical, cable, wireless, DSL, and the like.

The forwarding modules 72 may be configured in a work and protection configuration, such as 1:N and the like. Generally, the forwarding modules 72 are configured to provide layer two and layer three any-service, any-port forwarding and processing capabilities, traffic management and local switching functionality, including simultaneous support for IP/MPLS and ATM/PNNI control planes. The forwarding modules 72 are fully connected to each of the port adaptors 70 in the access device 42a allowing any-port to any-port functionality.

The transcoder device 52 is interconnected with each of the port adaptors 70 and forwarding modules 72. The transcoder device 52 is configured to receive video streams at high resolution from the forwarding modules 72. The transcoder device 52 includes circuitry configured to receive video streams from the port adaptors 70 and forwarding modules 72, perform transcoding to various different formats, and to transmit the transcoded video streams to the port adaptors 70 and forwarding modules 72. For example, the transcoder device 52 can include a line card configured in the access device 42a connected to the port adaptors 70 and forwarding modules 72 through the backplane, mid-plane, or the like.

In one exemplary implementation, the access device 42a can include one transcoded video signal per line/subscriber, e.g. per digital subscriber loop (DSL) line, per PON subscriber, per fast Ethernet (FE) subscriber, and the like, which is converted according to the requirements per line/subscriber. Another exemplary implementation could include a pool of digital signal processors (DSPs) in the edge device, and use them to provide several transcoded version of a stream per edge system with these being shared for all the lines, e.g. 100 transcoders for 200 lines create 100 variations of bandwidths. Here, the transcoder includes additional circuitry to provide the various variations of bandwidths.

Optionally, the access device 42a can include memory 74, such as memory per line, e.g. per DSL line or other port adaptor 70, or otherwise on the access device 42. The memory 74 allows a single transcoder's output (as in the pooled transcoder example, for example) to be time shifted as needed for the particular line given the operations the user is doing. This avoids the need for a VoD or other memory system. The memory 74 can be used for VoD operations such as fast forward, reverse, pause, etc. The memory 74 can be in any form, including volatile memory elements (e.g., random access memory (RAM, such as DRAM, SRAM, SDRAM, etc.)), nonvolatile memory elements (e.g., ROM, hard drive, tape, CDROM, etc.), and combinations thereof. The memory 74 can be used for timeshifting or other Video-on-Demand (VoD) operations.

Figure 5:
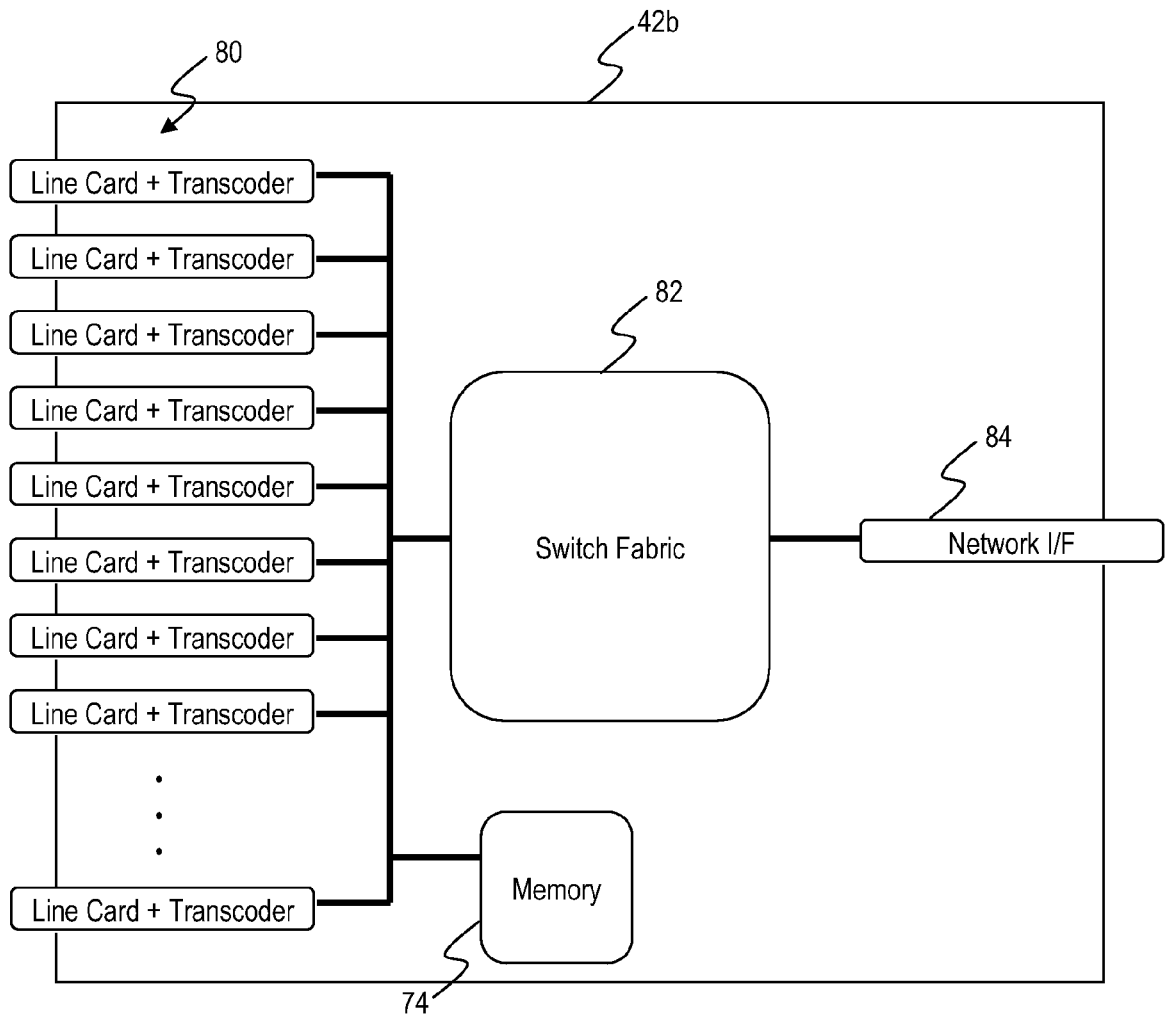
FIG. 5 is a block diagram of an access device with transcoder devices on each output line card according to another exemplary embodiment of the present invention.

Referring to FIG. 5, a block diagram of an access device 42b with transcoder devices on each output line card 80 is illustrated according to another exemplary embodiment of the present invention. The access device 42*b* includes a plurality of line cards 80 each equipped with a transcoder allowing each line card 80 to perform transcoding for itself. Each of the plurality of line cards 80 is connected to a switch fabric 82 which connects to a network interface 84. The switch fabric 82 is configured to provide switching of data to/from the plurality of line cards 80 to/from the network interface 84. The network interface 84 can include a GbE, 10 GbE, etc. and it connects to an external network, such as an access/aggregation network. The access device 42*b* can include, for example, a DSLAM, GPON head end, and the like.

In the access device 42*b*, the line cards 80 include transcoder functionality similar to the transcoder device 52 described in FIG. 4. Here, each card 80 is configured to transcode video streams received from the network interface 84 through the switch fabric 82. The line card 80 provides the transcoding for various clients attached to the line card 80. For example, the line card 80 can include DSL, cable, wireless, PON, etc. clients. This embodiment provides distributed transcoding functionality across the cards 80. Additionally, the access device 42*b* can also include memory 74 providing similar functionality as described in FIG. 4

Figure 6:
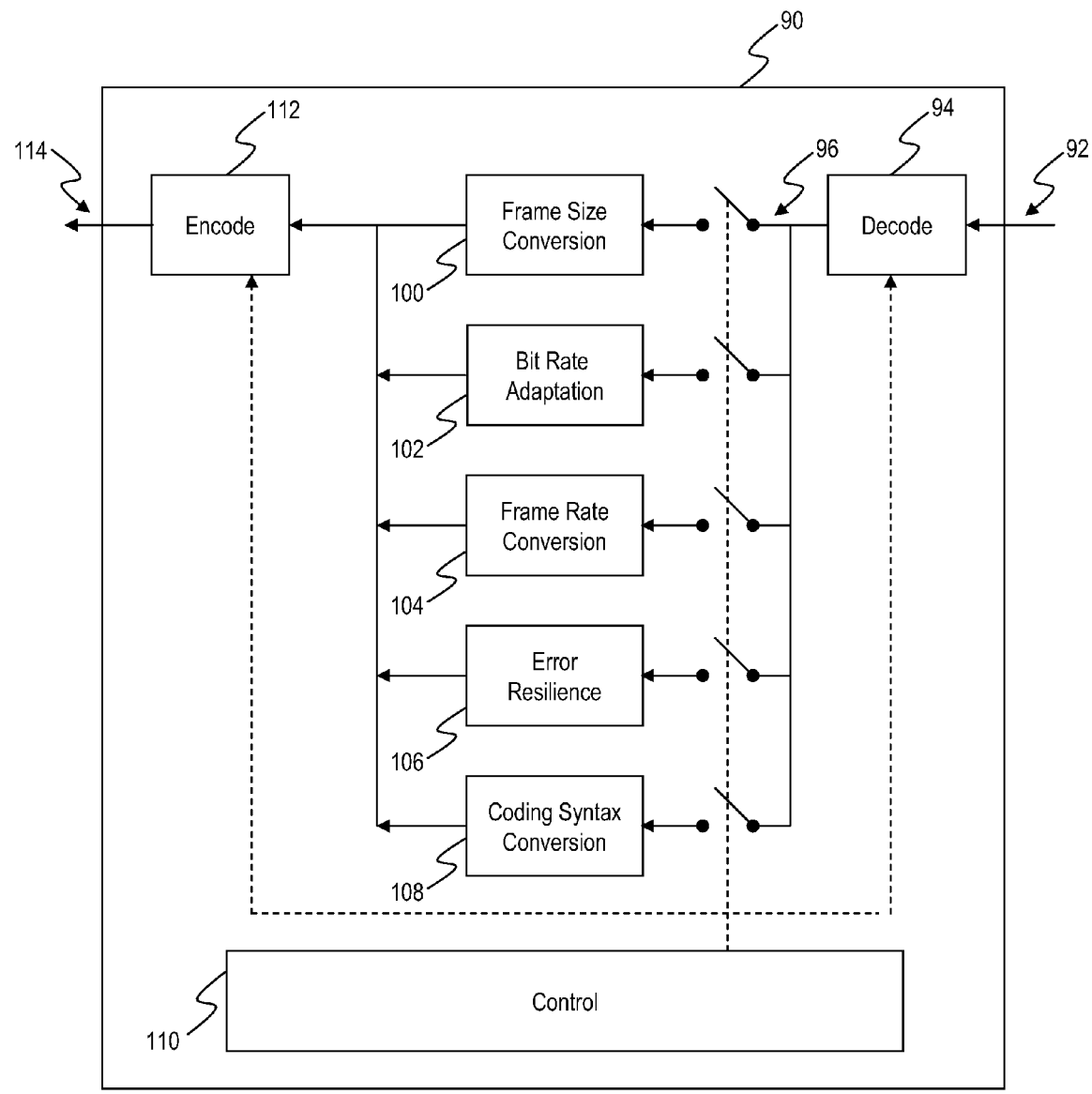
FIG. 6 is a functional block diagram of a transcoder which can be used in the transcoder devices described herein according to an exemplary embodiment of the present invention.

Referring to FIG. 6, a functional block diagram illustrates a transcoder 90 which can be used in the transcoder devices described herein according to an exemplary embodiment of the present invention. The transcoder 90 can be included in the transcoder device 52 and the line card 80. The transcoder 90 is configured to receive a video stream input 92 at a decode block 94. For example, the input 92 can be received from a network connection on an edge device. The decode block 94 is configured to decode the input 92 based on the specific format of the input 92, and to provide a decoded output 96 to various functional blocks 100-108 to perform various functions on the decoded output 96 responsive to control 110. An encoder 112 is configured to receive outputs from the various functional blocks 100-108 to provide a transcoded output 114. The transcoded output 114 can subsequently be provided to a client.

The various functional blocks 100-108 include a frame size conversion block 100, a bit rate adaptation block 102, a frame rate conversion block 104, an error resilience block 106, and a coding syntax conversion block 108. Each of these is connected to the control 110 which is configured to determine which functions to provide to the decoded output 96 responsive to the transcoding operation provided. The frame size conversion block 100 is configured to adapt the size of frames in the decoded output 96. The bit rate adaptation block 102 is configured to adapt the bit rate in the decoded output 96. The frame rate conversion block 104 is configured to convert the frame rate in the decoded output 96. The error resilience block 106 is configured to add error resilience, such as FEC, to the decoded output 96, and the coding syntax block 108 is configured to provide coding to the decoded output 96 based on the specific format selected.

As described herein, the transcoder 90 is configured to perform "transcoding" of multiple video streams, i.e. changing from one coding format to another (e.g. MPEG2 to H.264). The term "transcoding" is used herein to denote (a) actual transcoding and (b) lossy manipulation of the video stream, eliminating specific sub-streams or data content such as (i) low importance (e.g., high frequency components of a video stream that may have been encoded as multiple frequency overlays), (ii) low importance such as marked by an encoder, and (iii) low importance such as discarding B frames but not I or P frames in an MPEG-2 stream. This can also associate the term with repackaging into other video formats such as mpeg-2 to divx or to mpeg-4 or 3gpp formats etc.

Additionally, the transcoder 90 can provide other functions through the various functional blocks 100-108 such as transsizing, transrating, translating/converting, summarizing, reformatting, splicing, generating, and adding. Collectively, the functions of transcoding, transsizing, transrating, translating/converting, summarizing, and reformatting are herein defined as video processing. Transsizing includes no change in coding format (e.g. MPEG2-to-MPEG2), but changing the size of the image. This could be for display on a small screen or picture-in-picture (PIP). Transrating includes no change in coding format (e.g. MPEG2-to-MPEG2), but changing the effective bit-rate of the signal. This can be done by changing the MPEG2 compression parameters. Translating/converting can be, for example, text-to-speech. Summarizing can include selection of the key aspects of the content while omitting non-key aspects. Reformatting can include cropping out a part of a scene to view on a cell phone, for example, or zooming in on particular parts of the video image. For example, reformatting can include encoding a scene into different viewpoints for videos, such as for video gaming where the general map and game is loaded into the edge device, and it generates or assists the graphic viewpoint, scenery, physics engine, or other gaming requirements for each player. Adding can include customizing ("splicing") advertisements and the like given the physical knowledge of the users (and with the help of the network to know what streams of ads are relevant), possibly with ad segments locally stored. Generating can include generating 3-D physical models and generating different viewpoints. For example, gaming is done with physical world modeling which requires complex processing on the physical objects, and then generating one or more viewpoint for the user to see. With regard to encrypted video streams, the transcoder 90 can be configured for encryption removal and reinsertion while processing.

Figure 7:
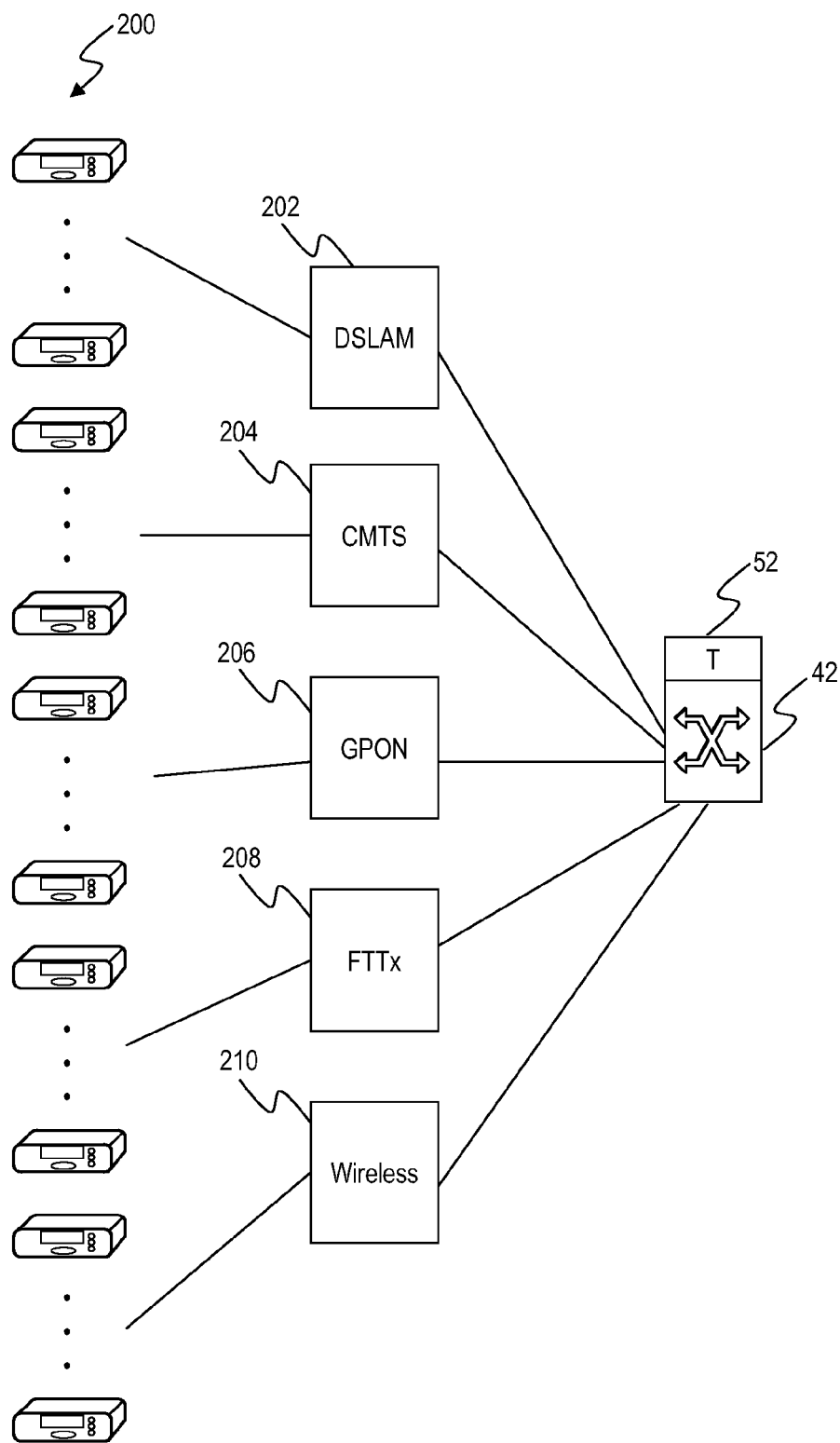
FIG. 7 is a diagram of an access device with a transcoder device connected to various end users according to an exemplary embodiment of the present invention.

Referring to FIG. 7, an access device 42 with a transcoder device 52 is illustrated connected to various end users 200 according to an exemplary embodiment of the present invention. As described herein, the access device 42 is located at an edge of an access/aggregation network. The access device 42 is configured to provide access to the various end users 200 through a variety of physical media including, for example, DSLAM 202, CMTS 204, GPON 206, Fiber-to-the-X (FTTx) 208, wireless 210, and the like.

The transcoder device 52 is configured to adapt video stream bandwidth responsive to the various physical mediums 202, 204, 206, 208, 210 and end users 200. For example, a DSL line off of the DSLAM 202 typically has limited bandwidth. Accordingly, the transcoder device 52 is configured to adapt for this for transporting video over DSL. Here, video streams are recoded for all requested channels to fit the available DSL bandwidth. This results in loss in quality, but the transcoder device 52 can be smart to compress based on content type. For example, HD streams could be compressed by a smaller amount than standard definition (SD) streams, and additional requested streams get compressed, but existing streams are left uncompressed.

In an exemplary implementation, a particular user 200 can be accessing three streams, such as one computer-based video stream and two television-based. Assume the DSL line is limited to 20 Mbps. Thus, the three streams must be kept to 20 Mbps, e.g. A+B+C=20 Mbps. The transcoder device 52 is configured to provide variable bit rate coding (VBR), so it is likely for each stream that at a time $t_1$, the stream bandwidth is different from a time $t_2$. However A+B+C is always equal or less than 20 Mbps. It is possible to favor streams, e.g. assume A is an HDTV and is always given a better resolution and quality level, which normally means more bandwidth, and assume C is a PIP or a mobile phone and can be downgraded to low bandwidths due to the screen resolution and possibly due to the terminal's capabilities, e.g. mobile phone requires different encoding standard and can only do 15 frames per second.

The transcoder device 52 can support transcoder multiplexing, i.e. by transcoding as a multiple of channels (e.g., channels A+B+C described above), the transcoder device 52 can support multiplexed VBR on each channel while maintaining a constant total bandwidth (CBR or constant bit rate) within the capabilities of the physical access media. This is similar an multiple program transport stream (MPTS) encoder but adapted to video service on an IP or Ethernet network. Here, the transcoder device 52 picks a set of VBR and makes those into a CBR. For example, this can include three TV channels on one DSL line. However, there can also be data traffic on the DSL line. So, these is three TV VBR+one data=CBR with the CBR equal to the DSL rate. The three TV VBR may be CBR and the data is CBR, or the three TV VBR equals some other VBR plus the data equals the CBR of the line. Alternatively, the TV VBR+one data=CBR of the line. So the sum of three TV VBR at a given constant "quality" is likely a VBR itself. On the other hand, the data is inherently VBR in the sense it fills any gaps, but would like a minimum rate always. Everything can be kept to a CBR then it's clean but not efficient for quality optimization (this is what most networks today us, such as IPTV). Alternatively, the present invention can squish the sum of three TV VBR to a constant and this scheme allows some improvement in quality at a lower total bandwidth. Also, the present invention can squish the three TV VBR+one data and give the maximum allowable to each at all times while maintaining the total bandwidth within some bound, for example to a fixed number since a DSL line is set to a given rate.

Additionally, the transcoder device 52 can be configured to dynamically and automatically adapt to all controllable variables to the given amount of available bandwidth on the line. For example, assume the user 200 has three TVs but only two are currently active (detected as described previously). Thus, the transcoder device 52 can transcode the two active video streams to maximize quality on the available bandwidth.

The transcoder device 52 can be configured for progressive transcoding where when transcoding to a lower quality stream, the transcoder device 52 does it progressively so that the transition is imperceptible to the viewer. This could apply to an enhanced instant channel change (ICC) mechanism also. ICC is where upon a channel change, a burst of video is sent to the end user 200 terminal (e.g., TV) in order to build a buffer. For example, this can include a progressive change so that over 10 seconds the video quality was slowly reduced. As described herein, transition denotes a transition in some parameter of the encoding, such as in this case the quality.

Optionally with the progressive transcoding, the transcoder device 52 can be constantly be re-encoding every channel so that there is always a version of the channel that begins with a start of encoder reference frame, e.g. I-frame, that can be sent to a subscriber the instant they join the channel. This is similar to ICC, but located at the DSLAM 202 (or other edge device) and integrated within a Multicast engine. The transcoder device 52 replicates the M/C stream, and can seamlessly switch from an ICC version of a channel to a main version of the channel within the M/C engine. Advantageously, the transcoder device 52 does not send the main M/C channel at the same time as an ICC burst, which saves about 30% in bandwidth.

The transcoder device 52 can be integrated into any edge device, such as the access device 42. The access device 42 can connect to one of the DSLAM 202, CMTS 204, GPON 206, Fiber-to-the-X (FTTx) 208, wireless 210, or it can include these functions. Alternatively, the transcoder device 52 can be integrated between any other device between a video source and the end subscriber 200. The present invention integrates a "non usual transcoder device somewhere between usual transcoder and last hop on network". A usual location for a transcoder is a video home office (VHO) with satellite downfeed, a production studio, a third party network, etc. The edge device (i.e., access device 42) is often be aware of the subscriber 80 in some fashion, although not necessarily; awareness can be in the form of physical connection to the subscriber (e.g., DSLAM), logical awareness (e.g., BRAS), and so forth.

In some cases, the access device 42 can also be the video source depending on its capabilities. Conceptually, this could be a co-located device, but practically it can also be integrated or remote. In an exemplary implementation, a first client at a particular user 80 can use Hypertext Markup Language (HTML), a second client can use Session Initiation Protocol (SIP), and a third client can use Internet Group Management Protocol (IGMP). The access device 42 is configured to translate all of these from the clients to the required network protocol. Additionally, the access device 42 can be configured to signal to the subscribed terminal the preferred signaling method. Note, this translation may require the access device 42 to participate in an encryption key exchange (or otherwise obtain keys) in order to decrypt requests, such as in some IP Multimedia Subsystem (IMS) networks, for example.

Optionally with progressive transcoding, the transcoder device 52 can utilize OpenCable Application Platform (OCAP) (cable middleware) as a middle layer upon which this service is built. Note, this could also apply for an Ajax client and a HyperText Transfer Protocol/Extensible Markup Language (HTTP/XML) client. This is referring to the signaling used by the client 200 to signify its needs. The OCAP, etc. resides on the client 200, and sends a specific format message to the network to request its needs possibly including transcoding, etc. Hence the edge (or deeper in the network) residing transcoder 52 needs to be aware of the requirements—be they signaled to the main network and then repackaged as a "standard" signal (such as provisioning system) back to the transcoder 52, or else intercepted on the way upstream and hence the transcoder signaling subsystem would have to speak whatever the end user requested. One way to do that is to include OCAP into the transcoder 52, but it is not required, simply the ability to interpret such messages. Sometimes as referred to previously, signals may be encrypted in which case the transcoder 52 system may need to have keys etc., or else as described let the core interpret and then send down a simplified message back to the transcoder 52. Note also that the transcoder 52 is likely decoupled from the signaling interpreter.

The access device 42 can also utilize knowledge of the physical transmission medium in embedding error corrections or transcoding. For example, knowing the last hop media is wireless or DSL may encode to compensate for lower latency (as media is higher latency), or may encode to higher error correction capabilities (since DSL or wireless have high bit errors), as opposed say to a fiber last hop. This enables dynamic adaptation for the various physical mediums 202, 204, 206, 208, 210.

Additionally, this knowledge of the physical transmission medium can be combined with physical layer forward error correction (FEC) to ensure a desired target bit error rate (BER). For example, FEC applied to a DSL line can tighten or relax the error correction applied to the video stream. Error correction in all cases can be applied to the packet level (IP or Ethernet), as an added extension into the packet (e.g., a FEC), as a physical media correction (e.g., a FEC on the DSL that is changed to ensure the session achieves desired goals), or even at the video codec level (e.g., MPEG-2 has error correction built in). Similarly, this can also be coupled with such mechanisms as provided by Very High Speed Digital Subscriber Line (VDSL) Digital Spectrum Management (DSM) techniques.

The transcoder device 52 can also incorporate layer two (L2)-aware traffic management capabilities, such as Ethernet based shaping and to adapt this traffic management to the transcoder and error correction mechanisms. Higher bandwidth coders require high bandwidth shaping or prioritization, also error coding requires more bandwidth to carry the FEC or to retransmit errored packets. Advantageously, traffic management enables the transcoder device 52 to adapt with based on traffic requirements. Also, this can be utilized as well with layer three (L3)-based edge devices, such as IP and MPLS. This can include the ability to prioritize requests for retransmitted frames since these need to be available before actual playback time.

Figure 8:
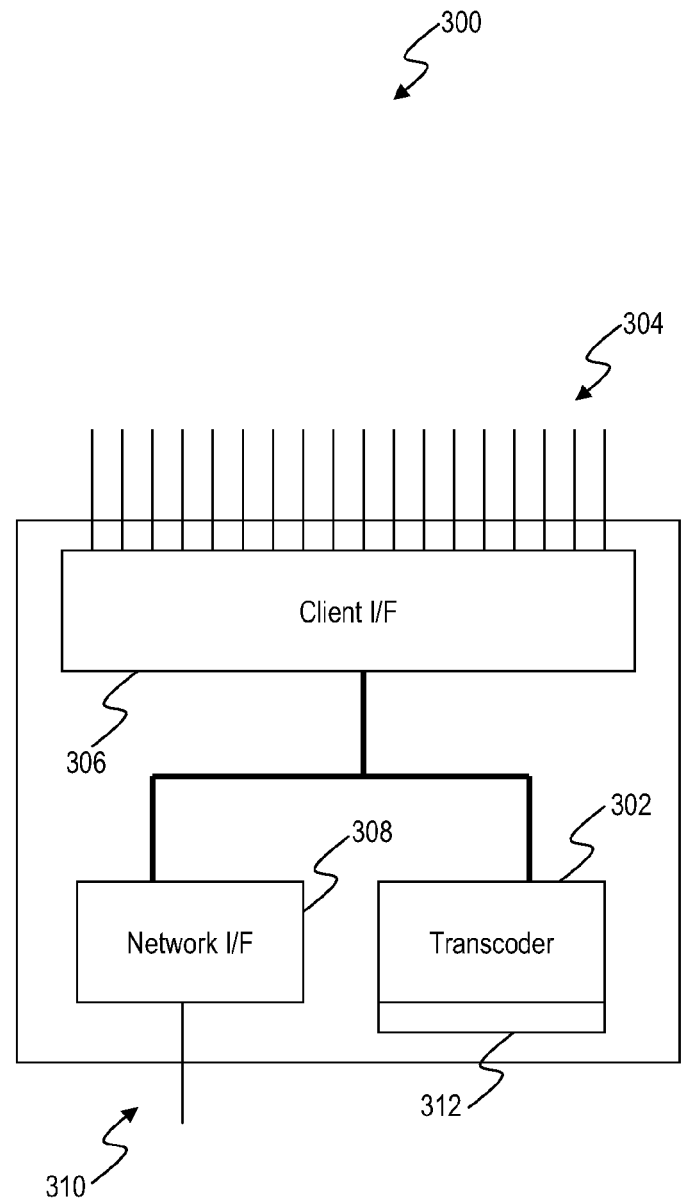
FIG. 8 is a diagram of a DSLAM configured with an integrated transcoder according to an exemplary embodiment of the present invention.

Referring to FIG. 8, a DSLAM 300 configured with an integrated transcoder 302 is illustrated according to an exemplary embodiment of the present invention. The DSLAM 300 is configured to multiplex multiple customer Digital Subscriber Lines (DSLs) 304 connected to multiple client interfaces 306 to a high-speed network interface 308. The network interface 308 includes a connection 310 to a network. The transcoder 302 is configured to provide transcoding as described herein for multiple high resolution video streams received from the network interface 308. For example, the network interface 310 can be configured to receive a satellite IPTV connection and a GbE connection for data. Here, the satellite IPTV connection is configured to bring in multiple channels to the DSLAM 300. The transcoder 302 enables the DSLAM 300 to adapt each channel based on individual customers needs or based on bit rate, error protection or correction, adaptable correction (e.g., lowering the bit rate and increasing error correction if the user STB or other terminal reports dissatisfactory performance, be it automatically measured (e.g., Video quality) or be it reported through user interaction (e.g., a menu choice), etc. Note, the transcoder 302 can also be integrated into CMTS devices, mobile base stations, and the like for similar functionality.

Additionally, the DSLAM 300 can include an embedded cache 312 for storing seconds to hours for each video stream to allow retransmission of selected packets across the final hop if the FEC failed and errors occurred. By embedding the cache 312 local to the DSLAM 300 the round trip time for request/retransmit is reduced and bounded; and scaling requirement is fixed by the number of DSL ports. This also removes processing load from the VoD or other video servers in the network since the processing for errors becomes localized. The embedded cache 312 can also be utilized for timeshifting or other VoD operations in addition to error correction. Error correcting resends a particular video segment (in addition to the FEC coupling etc.), however timeshifting literally stores an entire piece of a program for transmission at a given time later, and VoD adds the ability to replay on demand and do trickplay (e.g., FF, Rewind, Pause, Record, etc.). The embedded cache 312 can be in any form, including volatile memory elements (e.g., random access memory (RAM, such as DRAM, SRAM, SDRAM, etc.)), nonvolatile memory elements (e.g., ROM, hard drive, tape, CDROM, etc.), and combinations thereof. The embedded cache 312 with the transcoder 302 can allow sharing with other sources, particularly in the context of becoming an object sharing peer, for example BitTorrent or Joost system becoming one of the peers. Here, the embedded cache with the transcoder 302 can participate in a peer to peer or community computing, either by offering resources such as compute or memory to (presumably authenticated) entities, or as an active node, e.g. a Bitorrent node.

Advantageously with the integrated transcoder described herein, interpreting a channel set up request can be more intelligent on the resulting transcoding. For example. a SIP (or HTTP/XML) channel set up could include a session description. For example, via an Session Description Protocol (SDP) type structure. Here, the transcoder can read the session and determine the type of request and thus transcode correspondingly. Some session (or channel set up) descriptors could include set capabilities which could include bandwidth abilities, set size, decoder feature modes, error correction capabilities (from which different error correction schemes can be enabled), etc. Abilities may also include preferences. Thus, the edge device can negotiate the video transmission characteristics from the network to the edge device and from the edge device to the STB.

Figure 9:
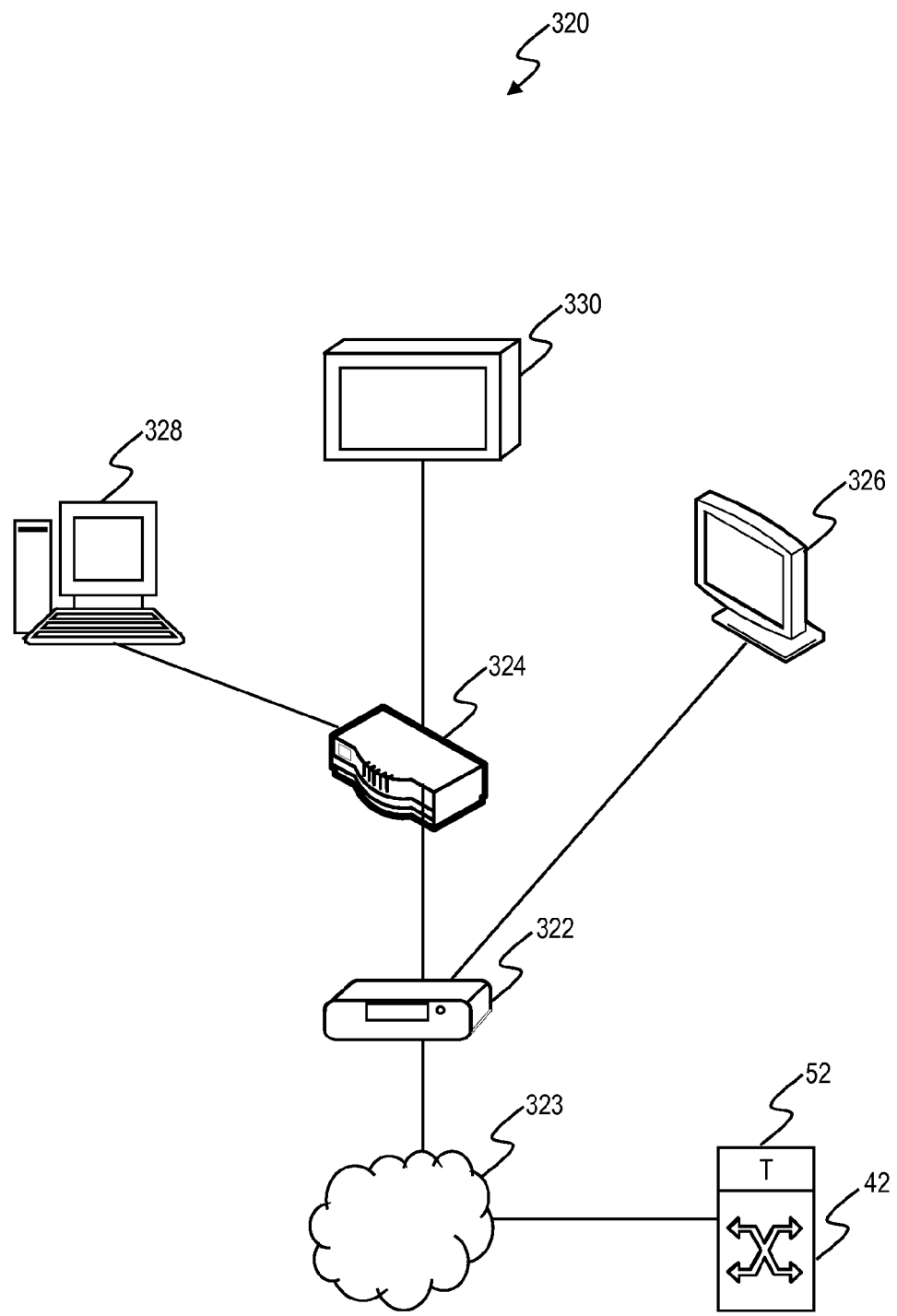
FIG. 9 is an exemplary user configuration connected to an access device with a transcoder according to an exemplary embodiment of the present invention.

Referring to FIG. 9, an exemplary user configuration 320 connected to an access device 42 with a transcoder 52 is illustrated according to an exemplary embodiment of the present invention. Here, the user configuration 320 includes an client access device 322, such as a cable modem, DSL modem, STB, PON unit, and the like, connected to the access device 42 through a connection 323, such as twisted pair, coaxial cable, fiber-to-the-home, wireless, etc. The client access device 322 can connect to a data router 324 or directly to user devices, such as a TV 326. The data router 324 can connect to a computer 328, a TV 330, or the like.

The transcoder 52 is configured to understand different signaling capabilities required for different client devices. For example, the computer 328 might use XML on a web page to access a channel, a carrier's device might use SIP, a cable STB might use Digital storage media command and control (DSM-CC), a Skype enabled device might use the Skype protocol, etc. Each of those could be interpreted by embedding a client of the appropriate type (e.g., HTTP/XML for the computer 328, AppleTV or similar Internet based client, etc.), thus enabling the access device 42 to make the broadcast medium available to whatever protocol's edge system requests are, without having to provide a separate stream for that protocol. Appropriate accounting links could be provisioned or dynamically established; and appropriate quality of service (QoS) and path creation links would also be included (e.g., a request triggers a SIP request to the network that creates a QoS tunnel to the server using standard SIP mechanisms—i.e. Call Session Control Function (CSCF), Home Subscriber Server (HSS), Policy Decision Function (PDF), etc.). In an exemplary embodiment, the client access device 322 can include a STB. The STN can include gaming consoles, computer access, and any other resources that can or are allowed to be used for connections. The transcoder 52 (i.e., transcoder block or location) has the ability to take signaling from the end user and translate it to network based signaling. For example, this could include taking DSM-CC or XML and converting it to SIP. This may imply decrypting/re-encrypting and key use.

The transcoders described herein can store video allowing two or more pass encoding of the video for higher transcoding quality. This is a transcoding technique wherein the video stream or part of the video stream is analyzed to determine which sections of the video need more compression to achieve the desired outcome quality and bit rates. By doing two pass, the transcoder can determine, for example, that at time $t_1$ the action is low and the bit encoding can be done with low efficiency (less processing by the CPU, DSP, graphics processor unit (GPU), etc.) whereas at a time $t_2$ there is a lot of action and a lot of processing is required. Thus, the transcoder can equalize the compute requirements, and right size the processing capabilities of involved devices.

Alternatively, the transcoder can perform a two pass (or more) processing mechanism wherein the transcoder spends the right amount of compression or processing power when transcoding multiple channels into one given bandwidth, such as described for the "transcoder multiplexing".

The transcoder might know from a previous pass (or set of passes) (e.g., first pass in a two pass system) that channel 1 and 2 being multiplexed are low complexity/low action at time t, whereas channel 3 being multiplexed is high complexity thus the transcoder can provide higher bandwidth (amount of bits) to channel 3 at this time, and additionally apply more processing power to it in order to better compress it (more processing power (may) results in better quality compression). Note that the multiple pass system can be implemented as a time multiplexing of the processes or physical (spatial) multiplexing or combinations thereof. An example of time multiplexing can be the use of one resource (CPU, etc.) to perform the work, and example of spatial multiplexing could be the use of multiple processors/resources to perform the work.

The present invention can use a Graphic Processing Unit (GPU) embedded in the edge device, in a network device, in an encoder to assist with video encoding, or other aspects of computing in the edge device including but not limited to those described herein.

In an exemplary embodiment, the present invention can provide the insertion and removal of test video by the edge device and the user terminal respectively, in order to test video quality. For example, the transcoder can insert a video clip two times, one as the original and one as currently set to encode and correct. The STB or other user terminal is able to compare the two and measure the quality of video received. This can provide edge device to STB (or routing gateway) monitoring of video at the FEC level, at MPEG level, at real media level, at packet loss level, etc. This can also provide intra-network error monitoring, i.e. from the VHO to the edge located transcoder. For example, referring back to FIG. 2, the network 30 can provide testing between the transcoder 52 and the video source 44, and testing between the transcoder 52 and the client 48. The video test signal is measured at a receiver, i.e. the client 48, and corrective actions can be taken accordingly by the network 30, the transcoder 52, the video source 44, etc. The client device 48 can include an STB or routing gateway configured to monitor video at a FEC level, at an MPEG level, at a real media level, at a packet loss level, etc. This monitoring and testing provides the ability to tweak the video quality from the edge without implicating the normal video servers, by responding to a request from a user regarding poor quality, or from a video test signal reporting poor quality.

The present invention can be applied to general storage and compute problem solving, wherein the DSLAM or other edge device participates in compute and storage applications specifically including peer to peer applications. Spare processing capacity or resources may be allocated into a network common pool. For example a DSLAM could become a peer node in a peer-to-peer network and assist an application such as bitorrent or a virus scanner or an intrusion detector.

In another exemplary embodiment, the transcoders embedded in the network edge devices can be used for other applications, such as hosted video console or other video guided networks. For example, a compute resource is hosting video for a video game. The edge device is used to adapt the video game's output video to the conditions as applied above. It is possible the transcoder is game aware to ensure proper details are maintained in relevant areas. This awareness could be via the way the stream is marked or by inference/participation in the game. This becomes more relevant in multiplayer games, for example, offering the other players' viewpoint to all or to a subset of players in the game. Here, edge node (or a server node) compresses the other players' video views to reflect each player's viewpoint, and adapts to the given viewing player's viewpoint and/or line conditions (e.g., how much bandwidth on the line is free). Also, the transcoder can be configured to splice in user advertisements and the like at this video processing point (edge device). Due to the fact the edge device is usually aware of each user it is possible to personalize ads, for example each user receives a different set of ads given their physical port (this operation likely assisted by the network for configuration intelligence).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network edge device with video processing capabilities, comprising:
   a network interface configured to connect to one or more switch/routers; and
   a transcoder configured to receive one or more video streams from the network interface, wherein the one or more video streams are transmitted over a network from the one or more switch/routers to the network edge device in a single high resolution encoding format, wherein the one or more video streams are in the single high resolution encoding format and wherein the transcoder is configured to process each of the one or more video streams based on an encoding format for a client connected to the network edge device, wherein the encoding format for the client is based upon requirements and characteristics of a physical medium to the client thereby reducing the single high resolution encoding format when required to the client based on monitoring the client's requirements and characteristics;
   wherein the network comprises an access/aggregation network utilizing layer two functionality and comprising the one or more switch/routers and the network edge device and the network further comprises a core network comprising a server utilizing layer two and three functionality and transmitting the one or more video streams; and
   wherein the one or more video streams are transmitted in the single high resolution encoding format in the core network and the access/aggregation network to the network edge device utilizing the transcoder to distribute the one or more video streams to a plurality of clients at different encoding formats and rates; and
   wherein the client is configured to request a channel from the one or more video streams, and wherein the transcoder is configured to interpret the request including Session Initiation Protocol, Hypertext Transfer Protocol, Extensible Markup Language Request, a Digital storage media command and control request (DSM-CC), a custom message over Internet Protocol, and an OpenCable Application Platform request, dependent upon the client's requirements and characteristics, and perform transcoding on the channel accordingly.

2. The network edge device of claim 1, wherein the transcoder is further configured to adapt bandwidth of each of the one or more video streams for the client responsive to current bandwidth between the network edge device and the client.

3. The network edge device of claim 2, wherein the transcoder is further configured to process multiple channels of the one or more video streams to provide a multiplexed variable bit rate on each of the multiple channels to the client; and
wherein a sum of the multiple channels in the multiplexed variable bit rate is shaped.

4. The network edge device of claim 2, wherein the transcoder is further configured to adapt processing based on activity of the client.

5. The network edge device of claim 2, wherein the transcoder is further configured to process the one or more video streams such that transitions in processing of one and more parameters of the encoding format are progressively coded to be imperceptible to the client.

6. The network edge device of claim 2, wherein the transcoder is further configured to maintain a version of each of the one or more video streams with a start of encoder reference frame so that the start of encoder reference frame can be sent to the client upon joining; and
wherein the transcoder is able to perform a burst after a channel change to refill a buffer.

7. The network edge device of claim 1, wherein the client connects to the network edge device through a physical medium comprising one of a digital subscriber loop, a coaxial cable connection, a wireless connection, Ethernet switch, Internet Protocol router, and a passive optical network connection.

8. The network edge device of claim 7, wherein the transcoder performs processing comprising embedding error correction based on the physical medium; and
wherein the transcoder monitors a physical layer forward error correction to meet a target bit error rate when encoding.

9. The network edge device of claim 1, wherein the transcoder comprises traffic management capabilities with an ability to prioritize requests for retransmitted frames.

10. The network edge device of claim 1, wherein to process comprises one or more of transcoding, transsizing, transrating, translating/converting, summarizing, reformatting, splicing, generating, testing, and adding to each of the one or more video streams.

11. The network edge device of claim 1, further comprising memory connected to the transcoder, wherein the memory is configured to store portions of the one or more video streams, and wherein the memory is utilized to provide trick play.

12. The network edge device of claim 11, wherein the transcoder is configured to retransmit video to the client from the memory as required; and
wherein the memory is utilized for video on demand functionality.

13. The network edge device of claim 1, wherein to process each of the one or more video streams based on the encoding format comprises transcoding to different encoding levels; and
wherein the transcoder comprises different encoders for a single line with multiple clients.

14. The network edge device of claim 1,
wherein the request comprises one or more of bandwidth abilities, set size, decoder feature modes, encryption, and error correction capabilities;
wherein the network edge device is configured to translate the request to the network interface; and
wherein the transcoder comprises encryption key support for encryption and decryption on any of the one or more video streams and the request.

15. The network edge device of claim 14, wherein the transcoder is configured to receive different signaling formats from the client.

16. The network edge device of claim 11, wherein the transcoder is configured to perform two or more passes for encoding.

17. The network edge device of claim 11, wherein the transcoder comprises a graphic processing unit.

18. The network edge device of claim 1, wherein one of a connection from the transcoder to the client, a connection from the transcoder to the one or more switch/routers, a connection from the one or more switch/routers to a core network, a connection from one of the one or more switch/routers to another one of the more or more switch/routers, and a combination thereof is configured to be tested and monitored with respect to video performance; and
wherein the client comprises one of one end and both ends of the connection at one or more of a forward error correction level, an MPEG level, a real media level, and a packet loss level.

19. The network edge device of claim 10, wherein the client comprises a set top box, and wherein a plurality of clients comprising set top boxes are configured as a distributed resource for processing the one or more video streams.

20. A method of providing video to a client through a network edge device, comprising:
transmitting one or more video streams each with an encoding format to the network edge device, wherein the encoding format comprises a single high resolution encoding format such that each of the one or more video streams are transmitted over a network to the network edge device in a same format;
receiving a channel request from the client for one video stream of the one or more video streams;
transcoding the one video stream based on available bandwidth to the client, wherein the transcoding is performed at the network edge device based upon current requirements and characteristics of a physical medium to the client thereby reducing the single high resolution encoding format when required to the client based on monitoring the client's requirements and characteristics; and
providing the transcoded video stream to the client;
wherein the network comprises an access/aggregation network utilizing layer two functionality and comprising one or more switch/routers and the network edge device and the network further comprises a core network comprising a server utilizing layer two and three functionality and transmitting the one or more video streams; and
wherein the one or more video streams are transmitted in the single high resolution encoding format in the core network and the access/aggregation network to the network edge device utilizing the transcoder to distribute the one or more video streams to a plurality of clients at different encoding formats and rates; and
wherein the client is configured to request a channel from the one or more video streams, and wherein the transcoder is configured to interpret the request including Session Initiation Protocol, Hypertext Transfer Protocol, Extensible Markup Language Request, a Digital storage media command and control request (DSM-CC), a custom message over Internet Protocol, and an OpenCable Application Platform request, dependent upon the client's requirements and characteristics, and perform transcoding on the channel accordingly.

21. A network with embedded video processing, comprising:

one or more network edge devices in an access/aggregation network utilizing layer two functionality; and a video source in a core network utilizing layer two and three functionality and connected to the one or more network edge devices through one or more switch/routers, wherein the video source is configured to provide one or more video streams to the one or more network edge devices over the network in a single high resolution encoding format, wherein the one or more video streams are transmitted in the single high resolution encoding format in the core network and the access/aggregation network to the network edge device utilizing a transcoder to distribute the one or more video streams to a plurality of clients at different encoding formats and rates;

wherein the one or more edge devices connect to and monitor bandwidth associated with one or more clients;

wherein the one or more network edge devices are configured to transcode the one or more video streams responsive to current requirements and characteristics of a physical medium to the one or more clients attached to the one or more network edge devices thereby reducing the single high resolution encoding format when required to the one or more clients based on monitoring the one or more clients' requirements and characteristics; and wherein the client is configured to request a channel from the one or more video streams, and wherein the transcoder is configured to interpret the request including Session Initiation Protocol, Hypertext Transfer Protocol, Extensible Markup Language Request, a Digital storage media command and control request (DSM-CC), a custom message over Internet Protocol, and an OpenCable Application Platform request, dependent upon the client's requirements and characteristics, and perform transcoding on the channel accordingly.

22. The network with embedded video processing of claim 21, further comprising one or more intermediate network elements connected to the one or more network edge devices;

wherein the one or more intermediate network elements are configured to transcode the one or more video streams responsive to clients attached to the one or more network edge devices.

23. The network with embedded video processing of claim 22, wherein the one or more network edge devices and the one or more intermediate network elements are configured to participate in a peer-to-peer network and in community computing.

* * * * *